Patented Aug. 4, 1931

1,817,525

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

PRODUCTION OF CHEMICAL WOOD PULP

No Drawing.     Application filed March 12, 1929. Serial No. 346,504.

This invention relates to the production of chemical pulps from raw cellulosic materials, being concerned with processes in which chemical cooking liquors more particularly of the alkaline type are employed to dissolve the cementitious material present in the raw materials and thus to effect liberation of the fibers.

There are various processes of producing wood pulp according to which chipped wood is placed in a digester together with chemical liquors capable of reacting upon and dissolving the material which cements or binds the wood fibers together and cooking of the wood in such liquors is effected at elevated temperature and under pressure. Those processes which are most commonly practised are the so-called soda process, wherein the cooking liquor consists essentially of a solution of caustic soda; the so-called sulphate process, wherein the cooking liquor consists essentially of a solution of sodium sulphide and caustic soda; and the so-called sulphite process, wherein the cooking liquor consists of a sulphurous acid solution of a bisulphite, e. g., calcium or sodium bisulphite. One of the significant costs in all these processes is that of the chemical used in the cooking liquor, particularly when sodium base chemicals such as caustic soda are employed. In fact, the commercial feasibility of fiber-liberating processes in which sodium base chemicals are employed depends upon a recovery of the valuable sodium base constituent present in the spent cooking liquors, and it is for this reason that processes such as the soda or sulphate process are commercially practicable only when provision is made for the recovery of the valuable inorganic compound of the spent cooking liquors. In such cases, the spent liquor is concentrated as by the use of multiple-effect evaporators, and the valuable inorganic content of the concentrated liquor is then smelted, whereupon the smelt is dissolved in water and the aqueous solution then causticized to produce a fresh cooking liquor for the cooking of other raw wood. Chemical losses suffered in the cycle are made up by the addition of fresh chemical to the fresh cooking liquor, as in the form of caustic soda in the soda process or in the form of sodium sulphate to the concentrated spent liquor being smelted in the sulphate process. The extent to which chemical loss occurs in a cycle depends not only upon the efficiency of the recovery system but also upon the concentration of chemical present in the cooking liquor, a high concentration of chemicals in the cooking liquor being accompanied by a high chemical loss. It is, however, commercially impractical to use liquors of low chemical concentration, as not only is a certain amount of chemical necessary to effect reaction upon a solution of the cementitious content of the wood, but excess chemical should be present so that fiber liberation may be effected in a reasonable period of time at temperatures and under pressures readily attainable.

I have found that when wood is cooked, preferably under pressure, in ammoniated water, a substantial proportion of the cementitious content of the wood is reacted upon and dissolved in a comparatively short period of time, even though such a liquor cannot effect fiber liberation under usual fiber-liberating conditions. Apparently, the ammonia rapidly and uniformly penetrates the wood and reacts upon and dissolves a portion of the encrusting materials, whereupon reaction substantially ceases. I have found that this reaction may be used to advantage in the production of wood pulp, as the wood may first be cooked in ammonia water until a substantial portion of its cementitious content is removed, whereupon the wood may then be cooked in one of the usual fiber-liberating liquors, e. g., an alkaline cooking liquor such as a solution of caustic soda or a solution of sodium sulphide and caustic soda. Inasmuch as the ammonia-cooked wood contains less cementitious material than the raw wood, the second cook may be effected in a liquor containing less chemical than usual and yet effect fiber liberation under the usual conditions of temperature, pressure, and time. This makes possible a lowering of the loss of fiber-liberating chemical in the second cooking cycle, for, as previously stated, the losses of chemical suffered when cooking in dilute liquors is less than when cooking in concentrated liquors. The ammonia used in the preparation of ammoniated water for the initial cook may be readily and substantially completely recovered during or after the cooking operation. The ammoniated liquor may be maintained under pressure in a closed digester so as to avoid loss of ammonia, but as the cook proceeds ammonia gas may be released from the liquor and passed through suitable towers wherein it may be absorbed in water or other suitable media, or through a suitable condensing system. Or the ammonia may be maintained confined in the digester throughout the entire cook, whereupon the gaseous content of the digester may be exhausted under atmospheric pressure or under vacuum, if desired, and the ammonia recovered from such gases, as previously described. Inasmuch as ammonia is but slightly soluble in water at high temperature and under atmospheric or sub-atmospheric pressures and forms unstable organic compounds which decompose readily at high temperature and under atmospheric or sub-atmospheric pressures, substantially all the ammonia may be recovered.

The process of the present invention may be best appreciated by citing a specific example of procedure such as the following. Chipped wood, e. g., spruce, may be placed in a digester together with ammoniated water containing, say, from 2% to 10% $NH_3$ and in sufficient amount to cover the chips. The ammonia may be present as such, but at least some of it may be combined as an ammonium salt, preferably ammonium sulphide, as hereinafter described. The digester may then be closed and the charge then cooked as by injecting steam thereinto at a temperature of, say, 285° F. and under a pressure of 100 pounds (both steam and ammonia gas pressure) for about three hours, ammonia gas being allowed to escape from the liquor during the last stages of cooking, into a recovery system, or the gas being exhausted or evacuated into a recovery system after cooking has been completed. The ammoniated water removes resins, ligneous matter and other cementitious materials from the wood, cooking under the conditions stated resulting in a spent liquor of deep brown color containing a substantial amount of organic matter which has been dissolved from the wood. The cooked wood may be separated from the spent liquor, as by washing, at this time the chips being substantially unchanged physically except that they are dark brown and somewhat softer than the original wood, but being incapable of yielding pulp by shredding or macerating. The chips may then be cooked in an alkaline liquor such as a soda cooking liquor, containing sodium sulphite if desired, such liquor containing much less chemical, say, one-half that of the usual cooking liquors of these types, cooking being effected under the usual temperature, pressure, and time conditions to effect fiber liberation. For instance, the chips may be cooked in an alkaline liquor containing 1.5 pounds of alkali per cubic foot, calculated as $Na_2O$, the liquor being a solution of caustic soda and sodium sulphide of which, say, 25% to 40% is sodium sulphide, such a liquor corresponding to the usual sulphate cooking liquor, except that it is of much lower chemical concentration. At the end of about four hours (the time usually required for a sulphate cook) a pulp corresponding to that of a good quality kraft pulp is obtained. The pulp may be washed free of spent liquor, the inorganic content of which liquor may be recovered as hereinbefore described.

The procedure hereinbefore given may be varied, if desired. For instance, the initial cook may be carried out at elevated temperature and under pressure in ammoniated water containing ammonium sulphide, particularly when the wood employed is very dense and high in lignin, or containing some alkali such as caustic soda and/or sodium sulphide and sodium carbonate, if desired, in which latter case the spent liquor resulting from the first cooking operation after the recovery of ammonia therefrom may be mixed with the spent liquor resulting from the second cooking operation, and the valuable inorganic content of the mixture recovered.

While the example hereinbefore given deals with the use of wood as the raw cellulosic material, the process of the present invention may be applied to other raw cellulosic materials, such as bagasse, cornstalks, straws, and grasses.

Having thus described the process of the present invention and its application in practice, it should be evident to those skilled in the art that various other changes and modifications might be made therein without departing from the spirit or scope of invention set forth in the appended claims.

I claim:

1. A step which comprises cooking raw cellulosic material in an ammoniated liquor containing ammonium sulphide at elevated temperature and under pressure to dissolve a portion of its cementitious content.

2. A step which comprises cooking raw cellulosic material at elevated temperature and under pressure in ammoniated water containing alkaline sodium base compounds in solution.

3. A process which comprises cooking raw cellulosic material in ammoniated water to dissolve a portion of its cementitious content and then cooking in a liquor containing both caustic soda and sodium sulphide to effect fiber liberation.

4. A process which comprises cooking raw cellulosic material in an ammoniacal liquor containing at least some ammonia as an ammonium salt, and then cooking in another chemical liquor to produce a finished pulp.

5. A process which comprises partially cooking raw cellulosic material in an ammoniacal liquor containing at least some ammonia as an ammonium salt, and then completing the cooking operation in another liquor of the alkaline type containing caustic soda.

6. A process which comprises partially cooking raw cellulosic material in an ammoniacal liquor containing ammonium sulphide, and then finishing the cooking operation in another chemical liquor.

7. A process which comprises partially cooking raw cellulosic material in an ammoniacal liquor containing ammonium sulphide, and then completing the cooking operation in another liquor of the alkaline type containing caustic soda.

In testimony whereof I have affixed my signature.

GEORGE A. RICHTER.